Nov. 23, 1937.  J. MICHAL  2,100,036

BRAKE FOR BABY CARRIAGES

Filed Jan. 21, 1936

Inventor:
James Michal
By: Stevens & Batchelor
Attys.

Patented Nov. 23, 1937

2,100,036

UNITED STATES PATENT OFFICE 2,100,036

BRAKE FOR BABY CARRIAGES

James Michal, Chicago, Ill., assignor to Storkline Furniture Corporation, Chicago, Ill.

Application January 21, 1936, Serial No. 60,102

11 Claims. (Cl. 188—20)

My invention relates to baby carriages, and more particularly to the brake gear thereof, and my main object is to eliminate the conventional brake applicable to the wheels of the carriage and substitute a ground brake therefor.

A further object of the invention is to provide a brake which does not require a hand lever or other attachment at the side of the carriage in order to operate or control it.

A still further object of the invention is to provide a ground brake which is directly applicable by foot pressure from a position behind the carriage.

Another object of the invention is to so design the novel ground brake that it becomes locked in position when once applied.

An additional object of the invention is to so apply the mechanism of the novel ground brake as to utilize the body springs of the carriage for placing the brake under tension when in the applied position.

A significant object of the invention is to include in the novel brake a simple foot-operated release by means of which the brake instantly rises out of engagement with the ground and assumes an out-of-the-way position.

An important object of the invention is to construct the novel brake to assume the form of a prop when applied and so resist tendencies to upset the carriage.

With the above objects in view and any others which may suggest themselves from the description to follow, a better understanding of the invention may be had by reference to the accompanying drawing in which—

Figure 1:
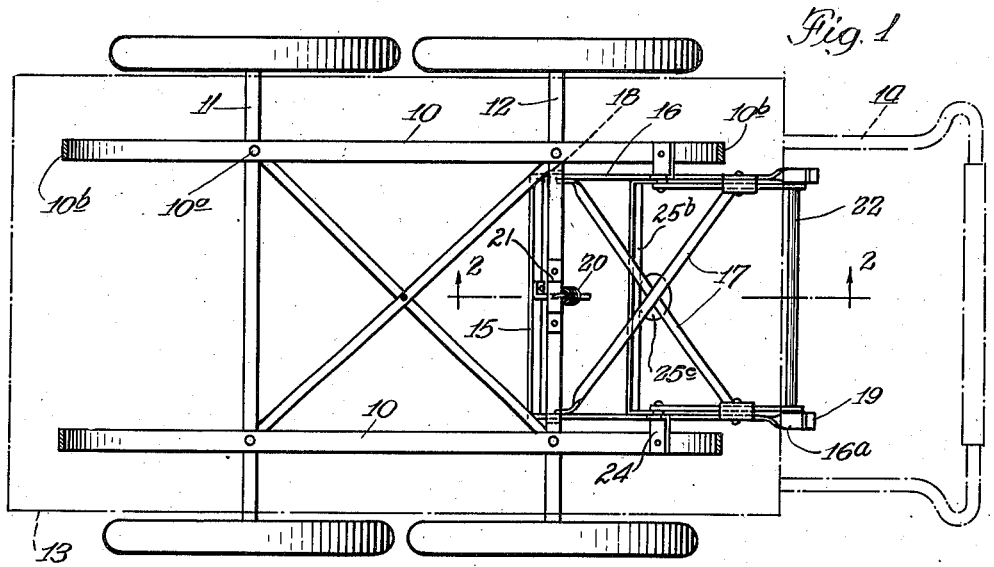
Fig. 1 is a plan view of a typical baby carriage frame in which the novel brake gear is mounted in the normal or non-use position.

Baby carriage brakes as commonly installed apply to the wheels, and more particularly to the tires thereof. These are frequently caused to wear unduly because of friction with the brake arms or shoes; also, when the tires are worn, the hold of the brakes becomes lessened, and a risk is incurred when the carriage is stationed on a sloping floor or sidewalk. To depart from this condition, I have devised a brake which secures engagement with the ground immediately behind the carriage when applied, so that the running gear and tires of the carriage receive no interference. In addition, the novel brake includes the prop previously referred to, and which is a safeguard against the overturning of the carriage when the occupant assumes a standing position, or attempts to climb out of the carriage.

In accordance with the foregoing, specific reference to the drawing indicates the base springs of the carriage at 10, and the front and rear axles at 11 and 12, these being secured to the springs by bolts 10a. These springs are bowed in an upward direction at their ends, as indicated at 10b. The approximate position of the carriage body is indicated by dotted lines at 13, and extended with dotted lines 14 to represent the push-handle.

Figures 4, 5:
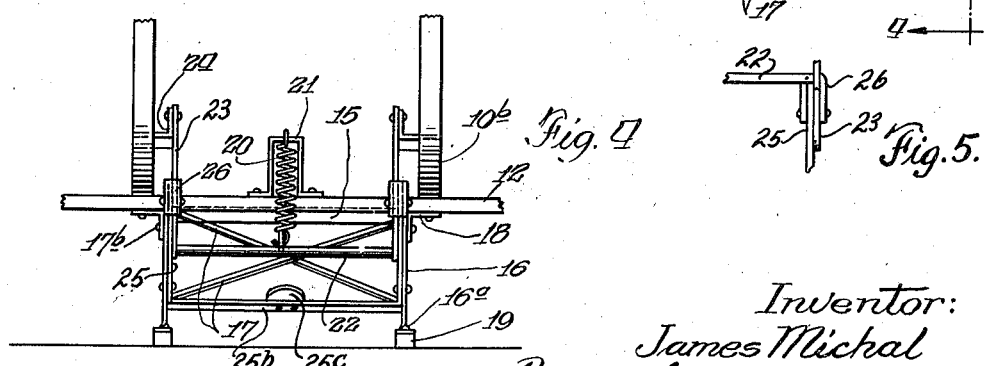
Fig. 4 is a section on the line 4—4 of Fig. 3.
Fig. 5 is an end view from the right of a stop yoke marked 26 in Fig. 4.

The novel ground brake is applied directly under and to the rear of the axle 12, comprising in general an arch formed from a strip of metal and composed of a head section 15 and side sections 16. The latter are reinforced to maintain their parallelism by an internal X-frame 17 secured by rivets 17a or other suitable means, and the arch is pivotally suspended at 17b from angle-brackets 18 depending from the axle 12. The free ends of the side pieces 16 are twisted at 16a to render them approximately horizontal and permit the application of rubber blocks 19 to the under sides thereof. Thus, while the arch is pointed fairly high in its normal position, as indicated in Figures 1 and 2, the application thereof involves its swing or descent about the pivots 17b to the lower position indicated in Figures 3 and 4, whereby to constitute the blocks 19 as feet and place them in engagement with the ground.

In the normal or raised position of the brake, the same is held by a spring 20 which is suspended from an arch 21 erected over the middle of the axle 12 and makes connection with a lug 15a extended rearwardly from the head section 15 of the brake. The spring 20 is therefore drawn into tension when the brake is applied as just outlined.

In order that the brake may be applied, a rod 22 is provided at the rear thereof and intended to be depressed by the foot of the attendant in order to secure the desired result. The rod 22 spans the rear end of a pair of arms 23 which are pivotally connected with their forward ends at 23a to angle brackets 24 carried by the spring portions or bows 10b. A connection is made between the arms 23 and the brake arch in the form of a pair of links 25. The rear ends of these make pivotal connections 25a at intermediate points along the arms 25, while the forward portions of the links make pivotal connections 16a at points approximately midway between the ends of the brake arch side pieces 16. Beyond these points, the links combine crosswise with a common bar section 25b, and a foot pedal 25c is extended downwardly from a medial position along the bar section 25b.

Figures 2, 3:
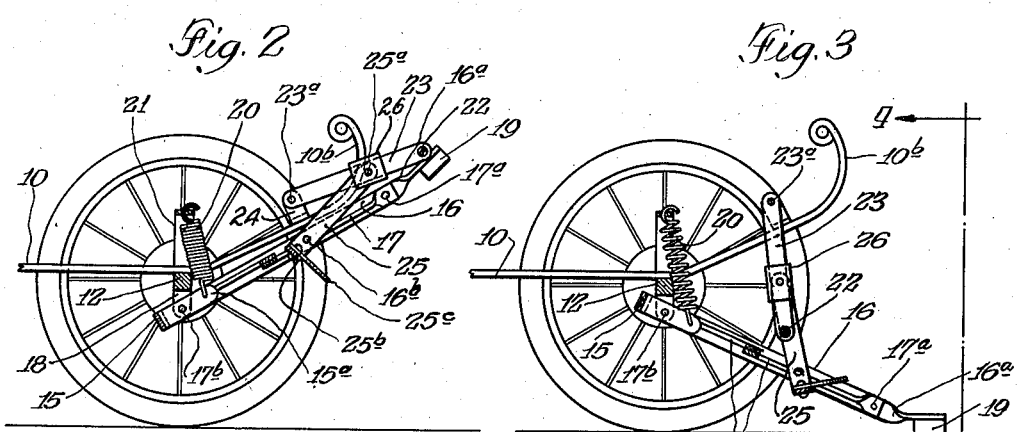
Fig. 2 is a vertical section on the line 2—2 of Fig. 1.
Fig. 3 is a view similar to Fig. 2, showing the brake applied.

When the brake is raised and out of use, as indicated in Figure 2, the spring brackets 24 form stops for the side pieces 16 of the brake arch to limit the rise of the brake in response to the pull of the spring 20, so that the normal position of the brake is so fixed. However, when downward pressure is applied to the foot rod 22, the downward swing of the arms 23 transmits similar motion to the brake arch through the agency of the links 25 until the rear portions of the arms have almost closed upon the links. The feet 19 of the brake are now in engagement with the ground or other surface upon which the carriage stands, and the slight further pressure upon the rod 22 procures no advance of the brake, but rather advances the lower portions of the arms 23 to the inner sides of the links 25 or beyond dead center, as shown in Fig. 3. When the parts just mentioned assume this position, the foot rod 22 is prevented from being pressed further by the action of a stop yoke 26 mounted over the junction of the arm and links at the site of the pivot 25a. Also, the brake cannot recede or rise upon the release of the foot rod 22 because the spring bows 10b were raised into tension by the arms 23 as these and the links 25 passed dead center. This fastening is also of importance when the ground or other surface to which the brake feet are applied is not even or is of a different height than that upon which the wheels of the carriage stand. The upward tensioning of the spring bows provides a leeway or allowance as the brake assumes engagement with the floor or other surface, whereby to take up inequalities or slight variations in the level of such floor or surface and still maintain the brake in firm engagement therewith.

When the brake is to be released, a slight downward pressure with the foot upon the pedal 25c causes the links 25 to swing in a clockwise direction about the pivots 16a as seen in Fig. 3. This action breaks the joint of the links and arms 23 at the pivots 25a in a right-hand direction, throwing the arms out of center alinement with the links. The brake arch now responds to the pull of the spring 20 and quickly rises to the poised position of Figure 2.

In considering the direction and operation of the novel brake, its first attribute is its position close to the spring bows 10b and high off the ground so as to be inconspicuous and entirely out of the way. This not only affords ample clearance for the feet of the attendant when standing or walking behind the carriage, but also allows full clearance when the carriage is wheeled over steps or curbs. Yet, the foot rod 22 is mounted to be reached and depressed with the foot when the brake is to be applied, this action placing the brake feet 19 in engagement with the ground at widely spaced positions, and making for balance and stability against the jars or twisting tendencies imposed upon the carriage. Further, the brake feet are carried by a sturdy arch or frame which is hung from points close to the axle and is therefore amply rigid to withstand strains imposed on the carriage from within or by gravity when the carriage stands on inclined ground. Further, the brake when applied extends a considerable distance to the rear of the wheels, as clearly indicated in Figure 3, whereby to counteract tendencies to overturn the arch in a rearward direction, as caused by attempts of the occupant to stand up, or lean over the rear end of the carriage body. In this connection it is understood that the occupant is seated facing rearwardly and is prevented more or less by such position and by the hood of the carriage from imposing overturning stresses in a forward direction. Yet, the prop formed by the brake for the purpose just mentioned is not merely a single member directed to the ground— as occurs in some structures marketed heretofore—but is actually a wide frame directed to amply-spaced points of engagement and securing an even distribution of pressure.

It is significant that the locking of the brake is secured without any further operation or attention by the attendant than the full depression of the foot rod 25a. The design of the mechanism procures the locking of the brake in a simple manner; yet, a touch of the pedal 25c unlocks the brake and releases the same for its automatic and instant return to the poised and out-of-the-way position. These considerations not only make the novel mechanism an easily-operated one, but also eliminate the necessity of handles, levers or other attachments to the carriage body to detract from its appearance and add expense. Finally, it will be appreciated that the novel mechanism performs both the functions of a brake and a safety prop in one compact and rugged unit, which involves no considerable expense and is capable of serving indefinitely without attention or repair.

I claim:

1. A ground brake for baby carriages comprising a brake member carried in poised position, foot-operated means to depress the member into ground engagement, means to lock the member in the position of engagement, foot-operated means to release the locking means, and a lifting element effective to restore the member to the poised position when said release has been accomplished.

2. A ground brake for baby carriages comprising a brake member carried in poised position, foot-operated means to depress the member into ground engagement, means to lock the member in the position of engagement, foot-operated means to release the locking means, and a lifting element automatically restoring the member to the poised position when said release has been accomplished.

3. A ground brake for baby carriages comprising a brake member extended in poised position from the rear of the carriage base, foot-operated means at the rear extreme of the member to depress the latter into ground engagement, means to lock the member in the position of engagement and move said foot-operated means to a forward position, other foot-operated means carried to a position to the rear of the first-mentioned foot-operated means by the depression of the ground engaging member and operative to release the locking means, and a lifting element effective to restore said member to the poised position when said release has been accomplished.

4. A ground brake for baby carriages comprising a member pivoted in poised position to the carriage frame and adapted to be lowered into ground engagement, and break links from the carriage springs to the member and assuming extended form when the member is in the lowered position.

5. The structure of claim 4, and a stop element to lock the links when in the extended position.

6. The structure of claim 4, the upper links being extended beyond the break joint, and a cross bar connecting the extended portions of the links.

7. The structure of claim 4, the lower links being extended beyond their connections with the proper frame, and means carried by the links to break them and effect the raising of the prop.

8. The structure of claim 4, the lower links being extended beyond their connections with the prop frame, and foot-operated means carried by the links to break them and effect the raising of the prop.

9. The structure of claim 4, the lower links being extended beyond their connections with the prop frame, a transverse element connecting the extended portions of the lower links, and a foot pedal carried by the element.

10. The structure of claim 4, the lower links being extended beyond their connections with the prop frame and united to form an integral cross bar, and a foot pedal carried by the latter in a central position.

11. A rear end prop for baby carriages, and means carried by the rear axle of the carriage to raise the prop, said means comprising a foot pedal, and a connection responsive to the depression of the foot pedal to raise the prop.

JAMES MICHAL.